(12) United States Patent
Flint et al.

(10) Patent No.: US 11,118,911 B2
(45) Date of Patent: Sep. 14, 2021

(54) LOCALIZED MAP GENERATION

(71) Applicant: Apple Inc., Cupertino, CA (US)

(72) Inventors: Alex Flint, New York, NY (US); Oleg Naroditsky, Brooklyn, NY (US); Andriy Grygorenko, Jersey City, NJ (US); Oriel Bergig, Lachis (IL)

(73) Assignee: Apple Inc., Cupertino, CA (US)

( * ) Notice: Subject to any disclaimer, the term of this patent is extended or adjusted under 35 U.S.C. 154(b) by 550 days.

(21) Appl. No.: 15/923,775

(22) Filed: Mar. 16, 2018

(65) Prior Publication Data

US 2018/0283877 A1 Oct. 4, 2018

Related U.S. Application Data

(63) Continuation of application No. 14/722,911, filed on May 27, 2015, now Pat. No. 9,964,409.

(60) Provisional application No. 62/003,441, filed on May 27, 2014.

(51) Int. Cl.
| | | |
|---|---|---|
| *G01C 21/20* | (2006.01) | |
| *G06T 7/73* | (2017.01) | |
| *G06T 7/246* | (2017.01) | |
| *G01C 21/16* | (2006.01) | |

(52) U.S. Cl.
CPC ........... *G01C 21/206* (2013.01); *G06T 7/246* (2017.01); *G06T 7/73* (2017.01); *G01C 21/165* (2013.01)

(58) Field of Classification Search
CPC .... G01C 21/206; G01C 21/165; G01C 21/36; G01C 21/005; G01C 19/721; G01C 21/18; G01C 21/32; G06T 7/248; G06T 7/246; G06T 7/73; G06T 2207/10028
See application file for complete search history.

(56) References Cited

U.S. PATENT DOCUMENTS

| | | | |
|---|---|---|---|
| 6,307,959 B1 * | 10/2001 | Mandelbaum | G06T 7/55 382/104 |
| 7,848,881 B2 * | 12/2010 | Tan | G01C 21/165 701/469 |
| 8,818,706 B1 * | 8/2014 | Ogale | G01C 21/206 701/409 |
| 8,838,374 B2 * | 9/2014 | Tan | G01S 19/49 701/408 |
| 9,170,113 B2 * | 10/2015 | O'Neill | H04W 4/024 |
| 9,175,975 B2 | 11/2015 | Shtukater | |
| 9,242,171 B2 * | 1/2016 | Newcombe | G06T 7/251 |
| 9,390,344 B2 * | 7/2016 | Pirchheim | G06K 9/52 |
| 9,400,930 B2 * | 7/2016 | Moeglein | H04W 4/33 |
| 9,405,972 B2 * | 8/2016 | Moeglein | G01S 5/163 |
| 9,412,173 B2 * | 8/2016 | Leonard | G06T 7/579 |
| 9,424,647 B2 | 8/2016 | Flint | |
| 9,429,434 B2 * | 8/2016 | O'Neill | G01C 21/206 |

(Continued)

*Primary Examiner* — Luis A Martinez Borrero
(74) *Attorney, Agent, or Firm* — Blank Rome LLP

(57) ABSTRACT

A method of creating a local map includes: receiving, at a mobile electronic data processing apparatus, a request from a server to generate a map of a specified destination; sending to the server a message accepting the request to generate the map responsive to receiving, at a user input of the mobile electronic data processing device, a user command indicating acceptance of the request; generating, using a processor, information related to construction of the map; an transmitting, from the mobile electronic data processing apparatus, the information related to construction of the map.

20 Claims, 8 Drawing Sheets

(56) References Cited

U.S. PATENT DOCUMENTS

| | | | |
|---|---|---|---|
| 9,607,401 B2* | 3/2017 | Roumeliotis | G06T 7/246 |
| 9,626,803 B2* | 4/2017 | Park | G06T 7/13 |
| 9,964,409 B1* | 5/2018 | Flint | G01C 21/206 |
| 10,027,952 B2* | 7/2018 | Karvounis | G06K 9/6248 |
| 10,109,104 B2* | 10/2018 | Newman | H04N 5/2253 |
| 10,203,209 B2* | 2/2019 | Roumeliotis | H04W 4/026 |
| 10,223,737 B2* | 3/2019 | Srinivasan | G06Q 30/0639 |
| 10,254,118 B2* | 4/2019 | Roumeliotis | B25J 5/00 |
| 10,422,645 B2* | 9/2019 | Rahman | H04W 4/029 |
| 10,466,056 B2* | 11/2019 | Jiang | G01C 21/32 |
| 10,502,576 B2* | 12/2019 | Trigoni | G01C 21/12 |
| 10,518,879 B1* | 12/2019 | Zhang | G06K 9/00664 |
| 10,657,691 B2* | 5/2020 | Zweigle | G06T 7/74 |
| 2006/0173613 A1* | 8/2006 | Iwahori | G09B 29/10 |
| | | | 701/450 |
| 2007/0010940 A1* | 1/2007 | Tan | G01S 5/0257 |
| | | | 701/469 |
| 2007/0200713 A1* | 8/2007 | Weber | H04L 67/18 |
| | | | 340/573.1 |
| 2007/0204218 A1* | 8/2007 | Weber | G01C 21/20 |
| | | | 715/234 |
| 2008/0147730 A1* | 6/2008 | Lee | G06Q 30/0212 |
| 2008/0266106 A1* | 10/2008 | Lim | G01C 21/20 |
| | | | 340/572.7 |
| 2009/0005061 A1* | 1/2009 | Ward | G01S 5/021 |
| | | | 455/456.1 |
| 2010/0103196 A1* | 4/2010 | Kumar | G06T 19/006 |
| | | | 345/633 |
| 2010/0235091 A1* | 9/2010 | Das | G01C 21/3602 |
| | | | 701/532 |
| 2010/0332125 A1* | 12/2010 | Tan | G01S 19/49 |
| | | | 701/408 |
| 2011/0064312 A1* | 3/2011 | Janky | G06K 9/00 |
| | | | 382/195 |
| 2011/0143775 A1* | 6/2011 | Liu | G06F 16/29 |
| | | | 455/456.3 |
| 2011/0310227 A1* | 12/2011 | Konertz | G06T 19/006 |
| | | | 348/46 |
| 2012/0039316 A1* | 2/2012 | Park | G01S 5/06 |
| | | | 370/338 |
| 2012/0069051 A1* | 3/2012 | Hagbi | G06T 19/006 |
| | | | 345/633 |
| 2012/0150434 A1* | 6/2012 | Cho | G01C 21/367 |
| | | | 701/445 |
| 2012/0176491 A1* | 7/2012 | Garin | G01S 19/49 |
| | | | 348/113 |
| 2012/0196679 A1* | 8/2012 | Newcombe | G06K 9/00664 |
| | | | 463/36 |
| 2012/0244889 A1* | 9/2012 | Nomachi | H04M 1/2745 |
| | | | 455/457 |
| 2012/0295632 A1* | 11/2012 | Karlsson | H04W 4/029 |
| | | | 455/456.1 |
| 2013/0216098 A1* | 8/2013 | Hasegawa | G06T 7/246 |
| | | | 382/103 |
| 2013/0244782 A1* | 9/2013 | Newcombe | A63F 13/42 |
| | | | 463/36 |
| 2013/0267178 A1* | 10/2013 | Pakzad | H04W 4/029 |
| | | | 455/67.7 |
| 2014/0051357 A1* | 2/2014 | Steer | H04W 76/14 |
| | | | 455/41.2 |
| 2014/0168212 A1* | 6/2014 | Jones | G06T 7/579 |
| | | | 345/420 |
| 2014/0172296 A1* | 6/2014 | Shtukater | G01S 19/13 |
| | | | 701/522 |
| 2014/0206380 A1* | 7/2014 | Do | H04W 16/20 |
| | | | 455/456.1 |
| 2014/0244502 A1* | 8/2014 | Zhao | G06Q 20/10 |
| | | | 705/44 |
| 2014/0267234 A1* | 9/2014 | Hook | G06T 19/006 |
| | | | 345/419 |
| 2014/0362255 A1* | 12/2014 | Kuang | H04N 5/23222 |
| | | | 348/231.5 |
| 2015/0043784 A1* | 2/2015 | Flint | G06K 9/00671 |
| | | | 382/106 |
| 2015/0070352 A1* | 3/2015 | Jones | G06T 7/75 |
| | | | 345/420 |
| 2015/0071524 A1* | 3/2015 | Lee | G06K 9/4671 |
| | | | 382/154 |
| 2015/0094089 A1* | 4/2015 | Moeglein | G01S 5/16 |
| | | | 455/456.1 |
| 2015/0094952 A1* | 4/2015 | Moeglein | H04W 4/33 |
| | | | 701/491 |
| 2015/0095350 A1* | 4/2015 | Chen | G01C 21/3679 |
| | | | 707/749 |
| 2015/0153180 A1* | 6/2015 | Ettinger | G01C 21/206 |
| | | | 701/410 |
| 2015/0256978 A1* | 9/2015 | Ogale | H04W 4/38 |
| | | | 455/456.1 |
| 2015/0308839 A1* | 10/2015 | Jiang | G01C 21/32 |
| | | | 702/5 |
| 2015/0373500 A1* | 12/2015 | Chen | G01S 5/0252 |
| | | | 455/456.1 |
| 2016/0005164 A1* | 1/2016 | Roumeliotis | G01C 21/16 |
| | | | 348/116 |
| 2016/0350926 A1 | 12/2016 | Flint | |
| 2017/0193710 A1* | 7/2017 | Kumar | G06F 3/012 |
| 2017/0241787 A1* | 8/2017 | Trigoni | G01C 21/206 |
| 2018/0113469 A1* | 4/2018 | Madison | G01C 21/165 |
| 2020/0218337 A1* | 7/2020 | Leppanen | G06F 3/04815 |

* cited by examiner

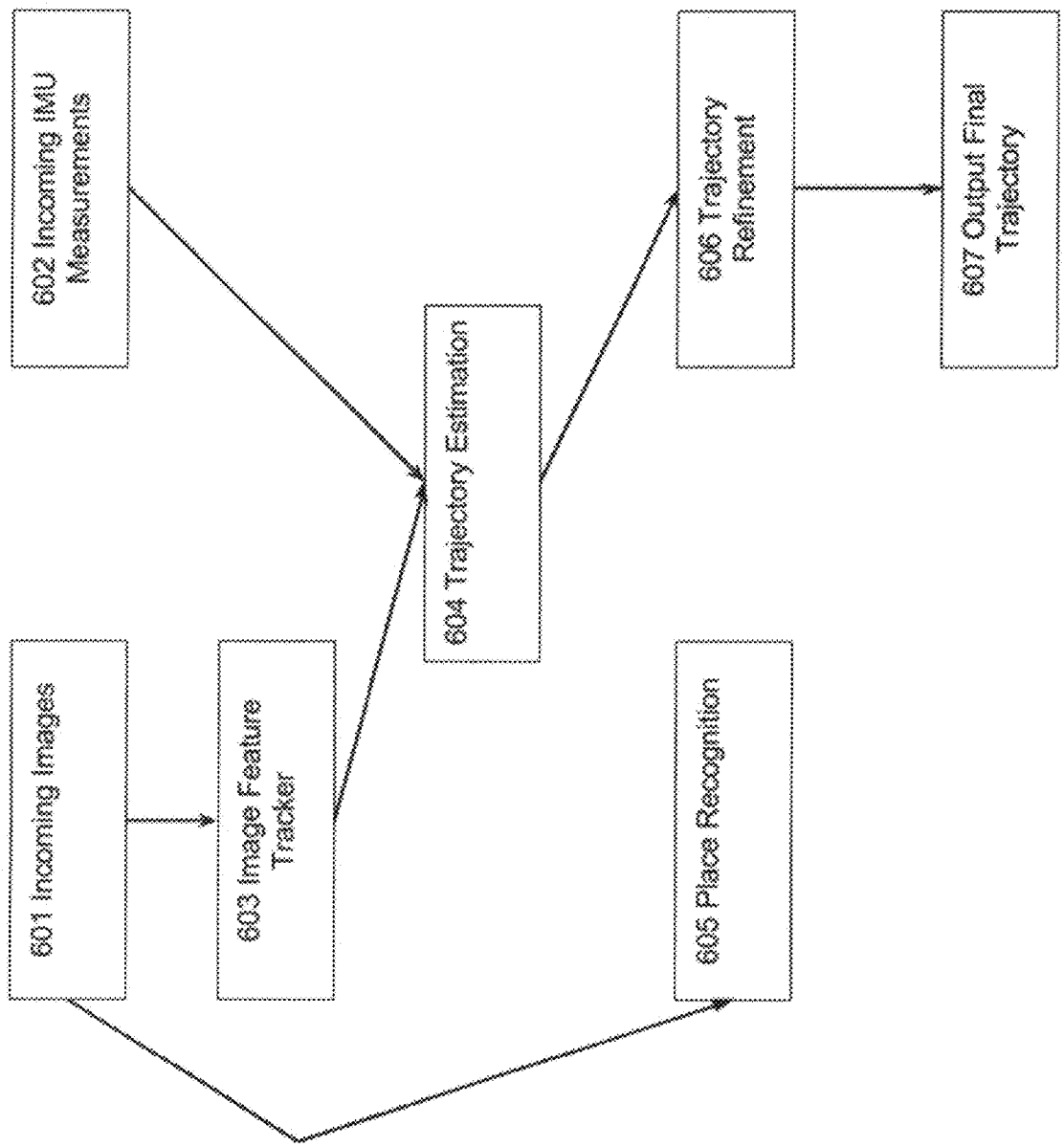

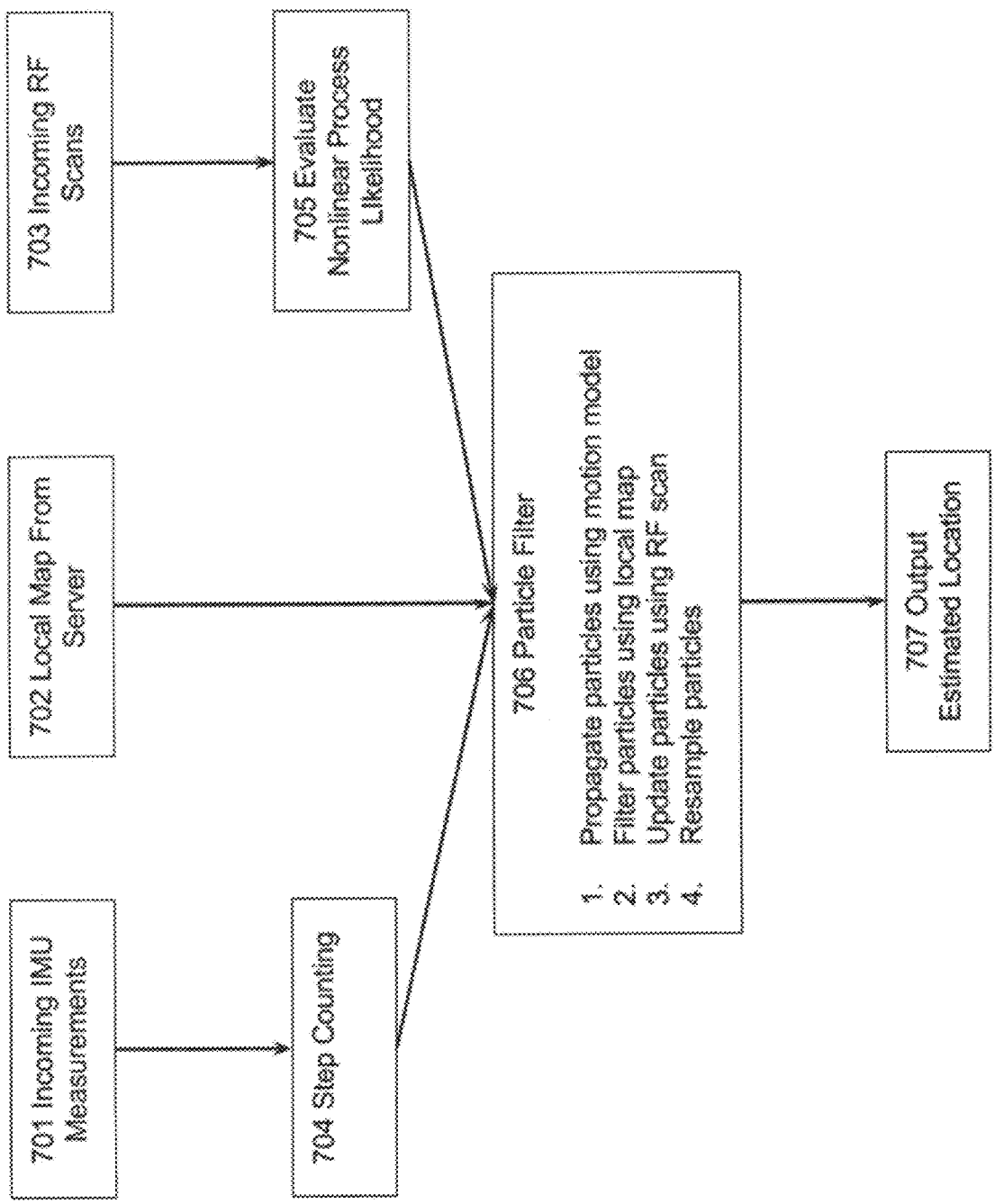

LOCALIZED MAP GENERATION

CROSS-REFERENCE TO RELATED APPLICATIONS

This application is a continuation of U.S. patent application Ser. No. 14/722,911, filed May 27, 2015, which claims the benefit under 35 U.S.C. § 119(e) of U.S. Provisional Application No. 62/003,441, filed May 27, 2014.

BACKGROUND

Satellite positioning systems (SPS) such as the Global Positioning System (GPS) provide position location capabilities in mobile devices, and typically provide accurate results in outdoor environments. However, SPS signals may not be reliably received in attenuated signal environments, such as indoor or dense urban environments. In these environments different positioning techniques may be used to enable localization of mobile devices. For example, a position fix for a mobile device may be computed by measuring ranges to terrestrial transmitters (e.g., cellular base stations or wireless access points) and then performing trilateration or another range-based positioning technique. In another example, a position fix may be computed by weighting the locations of terrestrial transmitters based on signal strength measurements received at the mobile device. However, such localization techniques may suffer from poor accuracy and/or the need for specialized device hardware.

SUMMARY

The present disclosure relates to localized map generation. In particular, the present disclosure relates to obtaining a map of a local environment indoors.

In general, in a first aspect, the subject matter of the disclosure may be embodied in methods of creating a local map, in which the methods include: receiving, at a mobile electronic data processing apparatus, a request from a server to generate a map of a specified destination; sending to the server a message accepting the request to generate the map responsive to receiving, at a user input of the mobile electronic data processing device, a user command indicating acceptance of the request; generating, using a processor, information related to construction of the map; and transmitting, from the mobile electronic data processing apparatus, the information related to construction of the map.

In another aspect, the subject matter of the disclosure may be embodied in a non-transitory computer storage medium encoded with computer program instructions that when executed by one or more electronic computing devices cause the one or more electronic computing devices to perform operations that include: receiving a request from a server to generate a map of a specified destination; sending to the server a message accepting the request to generate the map responsive to receiving a user command indicating acceptance of the request; generating information related to construction of the map; and transmitting the information related to construction of the map.

In another aspect, the subject matter of the disclosure may be embodied in systems having a processor including memory and programmed to perform operations that include: receiving a request from a server to generate a map of a specified destination; sending to the server a message accepting the request to generate the map responsive to receiving, at a user input, a user command indicating acceptance of the request; generating information related to construction of the map; and transmitting the information related to construction of the map.

Implementations of the methods, media, and/or systems can include one or more of the following features and/or features of other aspects. For example, in some implementations, the methods, media, and/or systems further include determining that the mobile electronic data processing apparatus is within a predefined distance of the specified destination, in which generating information related to construction of the map occurs subsequent to determining that the mobile electronic data processing apparatus is within the predefined distance.

In some implementations, the methods, media, and/or systems further include sending information about a location of the mobile electronic data processing apparatus to the server, in which the request to generate the local map is received subsequent to sending the information about the location of the mobile electronic data processing apparatus to the server.

In some implementations, the methods, media, and/or systems further includes receiving, from a user interface of the mobile electronic data processing apparatus, a confirmation that the mobile electronic data processing apparatus is substantially positioned at the specified destination, in which generating the information related to construction of the map occurs in response to receiving the confirmation.

In some implementations, generating the information related to construction of the map includes: obtaining a first set of images from an image detector of the mobile electronic data processing apparatus and inertial data from an inertial measurement unit of the mobile electronic data processing apparatus, in which the first set of images and the inertial data are acquired during movement of the mobile electronic data processing apparatus over a path at the specified destination; and creating a trajectory based on the first set of images and the inertial data. The methods, media, and/or systems may further include creating the map based on the trajectory. The methods, media, and/or systems may further include obtaining a second set of images; and refining the trajectory based on one or more images from the second set of images, in which the map is created based on the refined trajectory. Refining the initial trajectory based on the one or more images from the second set of images may include determining that the mobile electronic data processing apparatus has visited at least one position along the trajectory more than once.

The methods, media, and/or systems may further include: outputting to a user interface of the mobile electronic data processing apparatus a request to acquire the second set of images, in which the second set of images are obtained subsequent to outputting the request.

The methods, media, and/or systems may further include: receiving, from a user interface of the mobile electronic data processing apparatus, trajectory boundary information, in which creation of the map is further based on the trajectory boundary information. Receiving trajectory boundary information may include receiving a depiction of a floor plan around the trajectory, metadata associated with the floor plan or a sequence of edges defining the boundary. The depiction may include a drawing of the floor plan around the trajectory. The depiction may include features denoting traversable boundaries and/or features denoting non-traversable boundaries. The metadata associated with the floor plan may include annotating a room, annotating fixtures, annotating cashiers, doors and staircases. The sequence of edges defining the boundary may include placing the mobile device on some or all of the walls defining the boundary of the floor plan or placing the mobile device on some or all of the sides of fixtures defining the boundary of the fixtures. Placing the mobile device on edges may include placing the mobile device stationary on an edge for a period of time. The methods, media, and/or systems may include receiving, from a user interface of the mobile electronic data processing apparatus, one or more annotations at different points along the trajectory, in which the one or more annotations include a description of an object located at a position corresponding to a point along the trajectory. The methods, media, and/or systems may include outputting to a user interface of the mobile electronic data processing apparatus, a request to move the mobile electronic data processing apparatus along at least part of the same path corresponding to the trajectory. Creating the trajectory may include: identifying one or more features that are common across at least two images of the first set of images; determining a position and orientation of the mobile electronic data processing apparatus relative to an initial position and an initial orientation, based on the one or more common features in the first set of images and the inertial data. The inertial data may include acceleration measurements of the mobile electronic data processing apparatus and angular velocity of the mobile electronic data processing apparatus.

The methods, media, and/or systems may include recording, during the movement of the mobile electronic data processing apparatus, a signal strength of one or more electromagnetic signals.

In some implementations, the methods, media, and/or systems further include outputting the map to a display.

In some implementations, the methods, media, and/or systems may further include recording, during the movement of the mobile electronic data processing apparatus at the specified destination, a signal strength of one or more electromagnetic signals; and overlaying the recorded signal strength for at least one of the electromagnetic signals on the map. The electromagnetic signals may include low-energy Bluetooth signals and/or Wi-Fi signals.

In another aspect, the subject matter of the present disclosure may be embodied in methods of obtaining a local map that include: sending, from a server device to multiple mobile electronic data processing apparatuses, multiple requests to provide information related to a map of a specified destination; receiving, from a first mobile electronic data processing apparatus, a message accepting the request; retracting the requests to provide the information from the remaining mobile electronic data processing apparatuses; and subsequent to receiving the message accepting the request, receiving information about the specified destination obtained during movement of the first mobile electronic data processing apparatus at the specified destination from the first mobile electronic data processing apparatus. In some implementations, the methods further include receiving location information from one or more of the plurality of mobile electronic data processing apparatuses, in which, for each of the one or more mobile electronic data processing apparatuses, the location information includes an approximate current location of the mobile electronic data processing apparatus; and determining that at least one of the mobile electronic data processing apparatuses is within a predefined distance of the specified destination based on the location information. The request to provide the information is sent to the at least one mobile electronic data processing apparatus responsive to determining that the at least one mobile electronic data processing apparatus is within the predefined distance of the specified destination.

In some implementations, the method further includes receiving, at the server device, one or more notifications indicating a user interest in generating a map from at least one of the mobile electronic data processing apparatuses, in which the request to provide the information related to the map of the specified destination is sent to the at least one mobile electronic data processing apparatus based on the one or more notifications. In some implementations, the information about the specified destination includes the map of the specified destination.

In some implementations, the information about the specified destination includes a trajectory obtained by the mobile electronic data processing apparatus. The information about the specified destination may further include trajectory boundary information, in which the method further includes generating the map based in part on the boundary information and the trajectory. Boundary information may include metadata associated with a floor plan or an ordered sequence of edges defining the boundary. The metadata associated with the floor plan may include annotations of rooms, annotation for fixtures, annotations for door and staircases. The ordered sequence of edges defining the boundary may include orientation and position of one or more points on some or all of the walls defining the boundary of the floor plan or orientation and position of one or more points on some or all of the sides of fixtures defining the boundary of the fixtures. Placing the mobile device on edges may include placing the mobile device stationary on an edge for a period of time and then doing so repeatedly for the next edge in a sequence. The information about the specified destination may further include a signal strength of one or more electromagnetic sources recorded during movement of the first mobile electronic data processing apparatus, in which the method further includes generating the map based in part on the signal strength of the one or more electromagnetic sources and the trajectory.

In some implementations, the information about the specified destination includes a first set of images from an image detector of the mobile electronic data processing apparatus and inertial data from an inertial measurement unit of the mobile electronic data processing apparatus, in which the first set of images and the inertial data are acquired during movement of the mobile electronic data processing apparatus over a path at the specified destination. The methods may further include creating a trajectory based on the first set of images and the inertial data and creating the map based on the trajectory. The methods may further include submitting a payment to an account associated with a user of the first mobile electronic data processing apparatus subsequent to receiving the information related to the map.

In some implementations, the methods may further include receiving, at the server device, a request for the map of the specified destination, in which sending the multiple requests to provide information related to the local map occurs responsive to receiving the request for the map.

In another aspect, the subject matter of the present disclosure may be embodied in a system that includes: a server device; and multiple mobile electronic data processing apparatuses, in which the server device is configured to send to the multiple mobile electronic data processing apparatuses multiple requests to provide information related to a map of a specified destination, and receive the information related to the local map from at least one of the mobile electronic data units, in which the information related to the map includes information about the specified destination obtained during movement of the at least one mobile electronic data processing apparatus at the specified destination.

In some implementations, each of the mobile electronic data processing apparatuses is configured to send to the server an approximate current location of the mobile electronic data processing apparatus, and the server is further configured to: determine that at least one of the mobile electronic data processing apparatuses is within a predefined distance of the specified destination based on the location information; and send the request to provide information to the at least one mobile electronic data processing apparatus responsive to determining that the at least one mobile electronic data processing apparatus is within the predefined distance of the specified destination.

In some implementations, the server device is further configured to: receive, from at least one of the mobile electronic data processing apparatuses, one or more notifications indicating a user interest in generating a map; and send the request to provide information to the at least one mobile electronic data processing apparatus based on the one or more notifications.

Certain implementations may have particular advantages. For example, in some implementations, the present techniques offer the ability to locate a position of a device in an indoor environment without requiring the installation of beacons or other transmitter infrastructure, or specialized device hardware.

The details of one or more implementations are set forth in the accompanying drawings and the description below. Other features and advantages will be apparent from the description, the drawings, and the claims.

BRIEF DESCRIPTION OF THE DRAWINGS

FIG. 6 is a flow diagram illustrating an example process for use in calculating a trajectory of a mobile device as the mobile device traverses a specified destination.

FIG. 7 is a flow diagram illustrating an example process for use in localizing a mobile device using a local map.

DETAILED DESCRIPTION

Figure 1A:
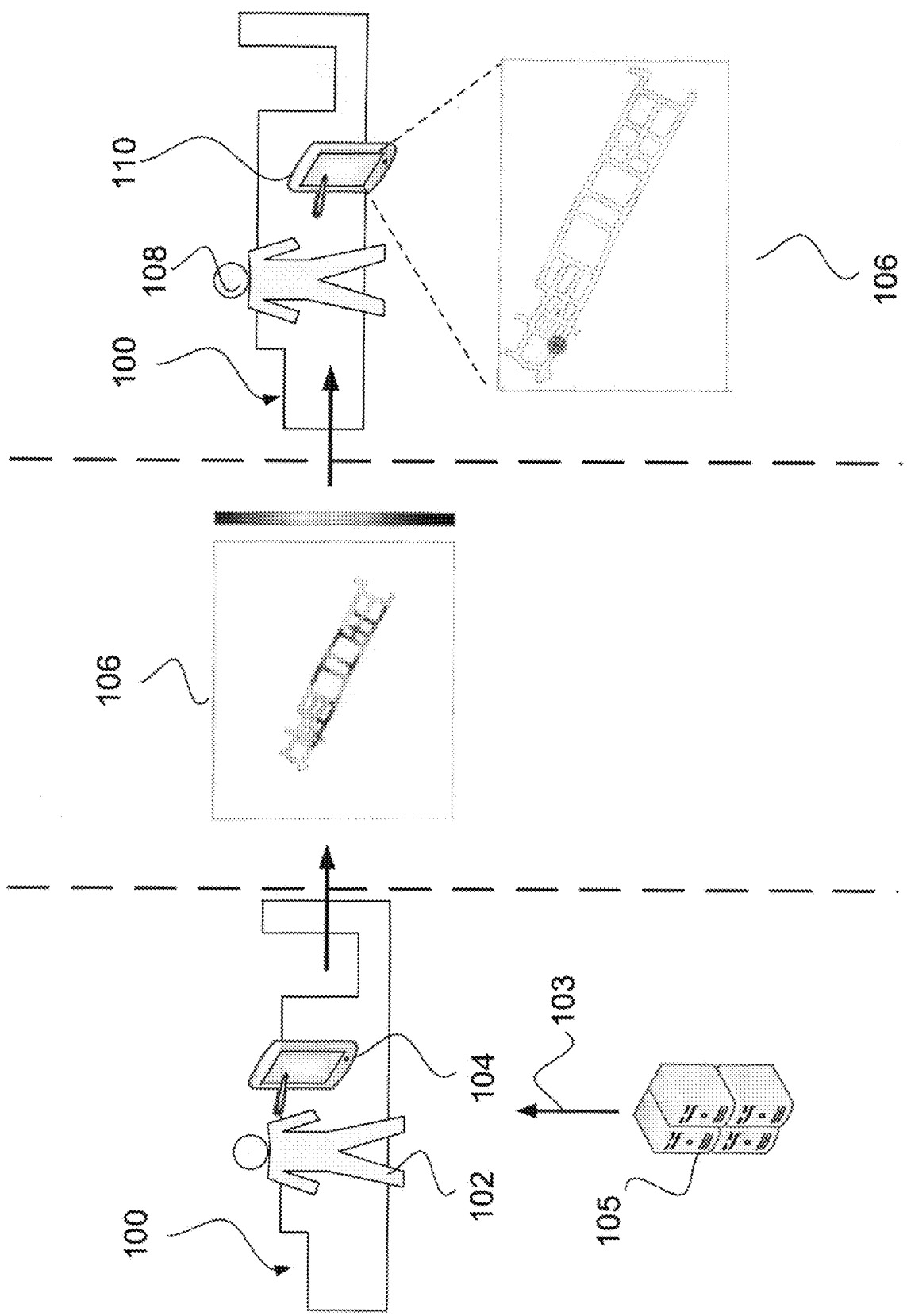
FIG. 1A is an illustrative diagram of an example indoor environment within which mapping and localization processes may be performed.

The present disclosure relates to processes for generating a map of a specified destination, such as an indoor environment, and for using the generated map to allow a person to determine their position and orientation in the indoor environment. The first process is understood as the "Mapping" phase and the second process is understood as the "Localization" phase. The Mapping phase entails mapping a specified destination based on information obtained with a mobile electronic data processing apparatus, such as a smartphone, electronic tablet device, or other mobile electronic data processing apparatus. The Mapping process may include traversing, with the mobile device, navigable paths and areas of the specified destination where localization may be performed at a later time. The Mapping phase may use computer vision technology that allows the mobile device to track user trajectories and create metric-scale representations of the surrounding environment without the use of GPS or the installation of specialized transmitter infrastructure. The output of the Mapping phase is a local map (e.g. a floor plan) of the specified destination. For the purposes of this disclosure, the map is referred to as a "local map" to distinguish from large scale maps, such as country or state level maps. In some implementations, the Mapping phase may be accomplished in conjunction with the use of crowdsourcing techniques. For example, requests to map one or more specified destinations may be issued to multiple users operating mobile devices, such that large collections of users may be leveraged to generate a wide assortment of maps for different destinations.

The Localization phase entails localizing a mobile device in a location that has been previously mapped. "Localization" includes determining a position of a mobile device as the device travels in a destination that was previously mapped. Various techniques may be used to localize a mobile device in a previously mapped destination. For example, the position of the device may be determined using a particle filter that relies on information such as estimation of the number of footsteps a person holding the mobile device has taken. Alternatively, or in addition, localization may be performed using a nonlinear process likelihood estimation of electromagnetic signals collected in the mapping phase and using boundary information (e.g. a floor plan) of the destination being traveled. In the Localization phase, the local map generated in the Mapping phase may be stored on the mobile device. The mobile device may be the same device used to generate the map or may be a different mobile device. The local map then is used as an input to a localization application running on the mobile device. The localization application in the mobile device is configured to use the local map, together with other inputs (e.g., electromagnetic signal measurements and/or inertial measurements), to estimate a position of the mobile device on the map. Once mapped, the user of the mobile device may be localized in a particular aisle or in front of a target product, so that location-based content or services may be delivered to the user. Localization of a user is especially advantageous for providing the user with the location-based content. For example, in some implementations, a user may be provided, through the mobile device, offers and discounts on products available at the user's current location once the device determines the user's position at the specified destination. Alternatively or in addition, location-based services may be delivered to the user, through the mobile device at the time of a purchase decision.

In an example scenario, a customer is in a Best Buy retail store, standing in front of the TVs and making a purchase decision. If the customer is operating a mobile device on which the localization application is executed, the customer may automatically receive on the mobile device media and offers (e.g., coupons and other discounts) from the manufacturer and/or retailer relevant to the products the customer is browsing. The offers do not necessarily need to come from the manufacturer or the company the customer is patronizing. Rather, in some cases, the customer may receive offers and media from other entities that sell the same products. For example, a user browsing products in a brick and mortar store may receive discounts on those same products from an online retailer.

FIG. 1A is a schematic of an example indoor environment 100 within which mapping and localization processes may be performed. For example, the indoor environment 100 may be a hardware store, such as Home Depot. Prior to a customer's arrival at Home Depot, the mapping process may performed inside the store. In an example implementation, a user 102 operating a mobile device 104 (e.g., a smartphone or tablet device) that stores and runs a mapping application according to the present disclosure may receive a request 103 from a server device 105 to generate a local map of a specified destination, e.g., the indoor environment 100. The request may be received, for instance, as an e-mail message, text message or message delivered to the mapping application on the device. In some cases, requests are only sent to users that have registered with a mapping service, whereas in other cases, the requests are sent to any mobile devices on which the mapping application is installed. In some instances, the requests are sent to devices based on the location of the device relative to the destination to be mapped.

Figure 1B:
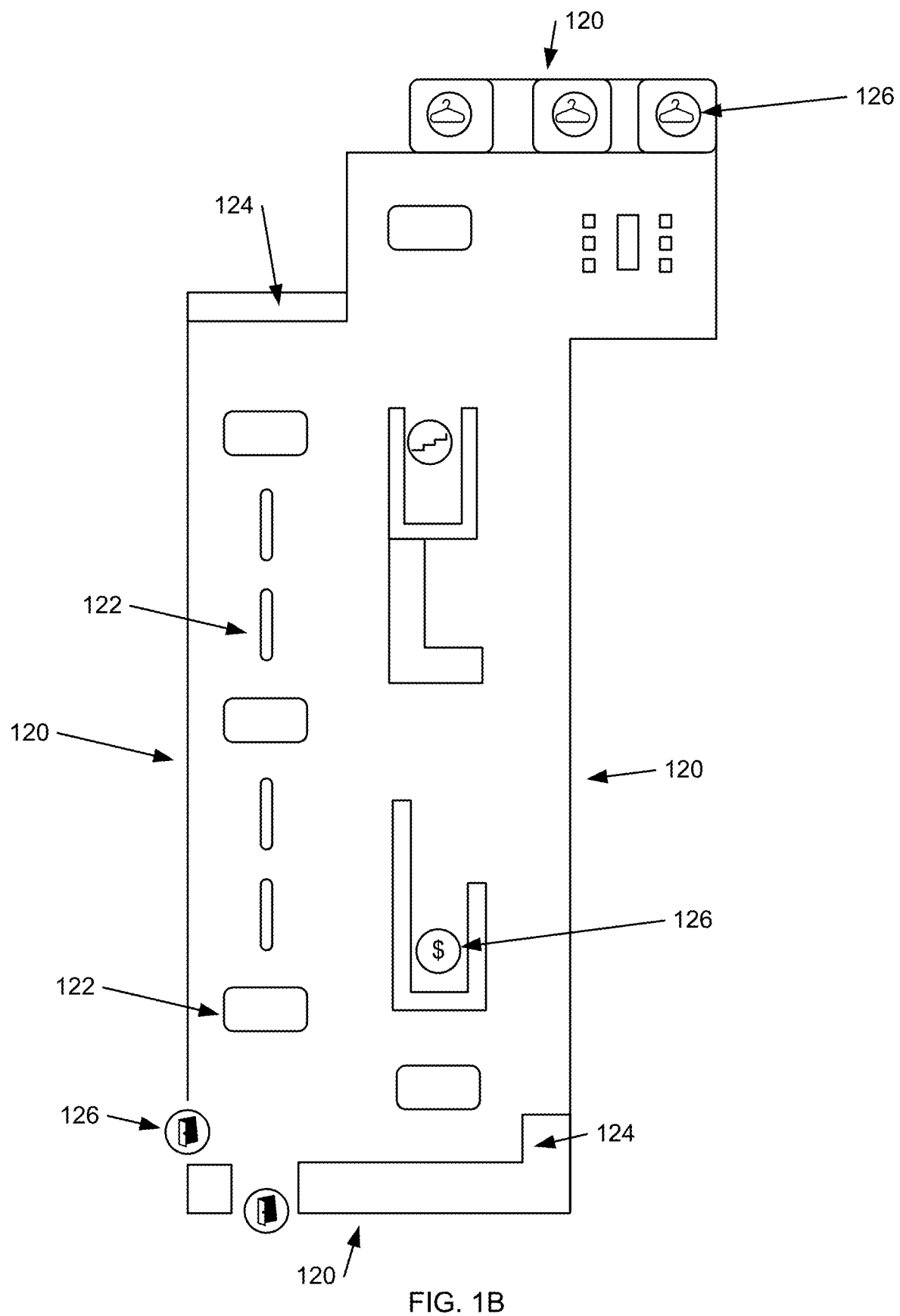
FIG. 1B is a schematic illustrating an example of a map.

The user 102 that has received the request on their mobile device 104 may accept the request to map the specified destination. Subsequent to accepting the request, the user 102 traverses different possible paths inside the store while recording images of the destination using an imaging component (e.g., a camera) of the mobile device 104. In some implementations, the mobile device 104 may also detect and record inertial measurements 104. In some cases, the mobile device 104 may also detect and record measurements of electromagnetic signals, such as local radiofrequency (RF) signals (e.g., signals from nearby Wi-Fi networks). The mobile device 104 may include a visual inertial navigation engine that then calculates the trajectory followed by the user 102 as the user 102 traverses the store based on the images, inertial data, and/or electromagnetic signal measurements. Based on the trajectory information, a map 106 of the specified destination may be generated. For example, in some cases, the mapping application on the mobile device 104, itself, may create the map 106. Alternatively, the mobile device 104 may transmit the trajectory information to another device (e.g., the server device that issued the request) that generates the map 106 from the trajectory information. In some implementations, the user 102 may receive on the mobile device 104, while traversing the destination, a request from a server device to create annotations for one or more features on the map. For example, the user 102 may receive a request to annotate features in the specified destination such as aisle numbers or locations of particular products. In some cases, the user 102 may receive on the mobile device 104 a request to collect boundary information for the trajectory, such as walls, shelves, fixtures, doors, and/or aisles, in order to establish a floor plan. In some implementations the user 102 may collect boundary information by placing the mobile device 104 on edges defining the boundary such as walls to define the venue walls (layout of the floor plan) or the edges of fixtures (e.g. table, display, shelf) to define fixtures boundary. FIG. 1B is a schematic illustrating an example of a floor plan created using boundary information collected by user 102. The outline of the floor plan 120 was calculated in this example using the trajectory information and user 102 placing the mobile device on walls defining the outline for a short period of time. The example fixtures 122 were calculated in this example using the trajectory information and user 102 placing the mobile device on the edges of the fixtures and annotating when a new fixture is added using a user interface. The example fixtures 124 were calculated in this example using the trajectory information and user 102 placing the mobile device on only some of the edges of these fixtures and annotating when a new fixture is added using a user interface. The example icons 126 representing entrances, a cashier and dressing rooms were calculated in this example using the trajectory information and user 102 annotating the entrance, cashier and dressing room on a user interface.

In some implementations, the mobile device 104 may include an interactive drawing tool on which the user can draw the boundary information for the calculated map. The drawing tool can be used for example with fixtures 124 to add edges that were not included previously by placing the mobile device on them. Alternatively, or in addition, the boundary information may be added using an interactive drawing service hosted on a web page that can be accessed by the user 102 or another person (e.g., through the mobile device 104 or other electronic data processing apparatus). The annotations, including the boundary information, may be added to the trajectory in real-time by the user 102 as the trajectory information is recorded or, alternatively, the trajectory information may be stored in memory on the mobile device 102 or another device for annotation at a later point in time. In some implementations, the map 106 that is generated is overlaid with information regarding the strength of local electromagnetic signals in the area being mapped. For instance, as shown in FIG. 1A, the map 106 that is generated is overlaid with a heat map depicting the strength of a Wi-Fi signal in the area of the indoor environment 100.

In some cases, the mapping application on the mobile device 102 generates the local map 106 based on the trajectory information and annotations provided by the user 104. Alternatively, the trajectory information may be transmitted to a separate device (e.g., a server device or a series of devices, such as a cloud service) over a network, in which the map 106 is generated on the separate device. In some implementations, the process of generating the map 106 entails giving the user 102 an item of value in return for the user's services of obtaining the trajectory information and/or generating the map of the specified destination. The item of value may include, for example, payment for services rendered or a gift card.

Once the map 106 is generated, the map 106 may be stored and/or output to a display for the purpose of performing "localization." For instance, the map 106 may be output to a display of the same device 104 that was used to obtain the trajectory information related to the specified destination. In some cases, the map 106 may be downloaded from a server or cloud service by one or more other mobile devices 110 running a localization application according to the present disclosure. The map 106 may also be output to the displays of the other mobile devices 110. A customer 108 operating the mobile device 110 and who has downloaded the map 106 can use the map 106 and the localization application to determine their position within the indoor location 100 to a high level of accuracy, as well as to locate specific items of interest, such as particular locations of the destination or desired products. In some implementations, only a portion of the map 106 is downloaded. For instance, a user may be interested in only a single floor or a single store of a large mall. Thus, it would not be efficient to download the entire map for the mall, and therefore only the relevant portion of the map may be downloaded. In some cases, a user may only be interested in specific types of annotations such as sales. In those instances, the user may download a map containing only the desired annotations. Alternatively, the user may display on their device only the desired annotations. In some implementations, the customer's mobile device 110 also performs a scan for electromagnetic signal measurements at the destination. The localization application running on the mobile device then utilizes the local map, optionally with the measured electromagnetic signals and/or measurements of the inertial state of the device 110, to continuously estimate and refine the position of the device 110. This localization process enables the customer 108 to quickly and accurately locate desired areas of the destination (e.g., specific aisles or departments of a store) and/or desired items available at the destination (e.g., the location of particular products sold at a store). Localization of the user also enables location-based content such as offers or coupons to be delivered to the customer 108 when the customer is present at the destination.

Figure 2:
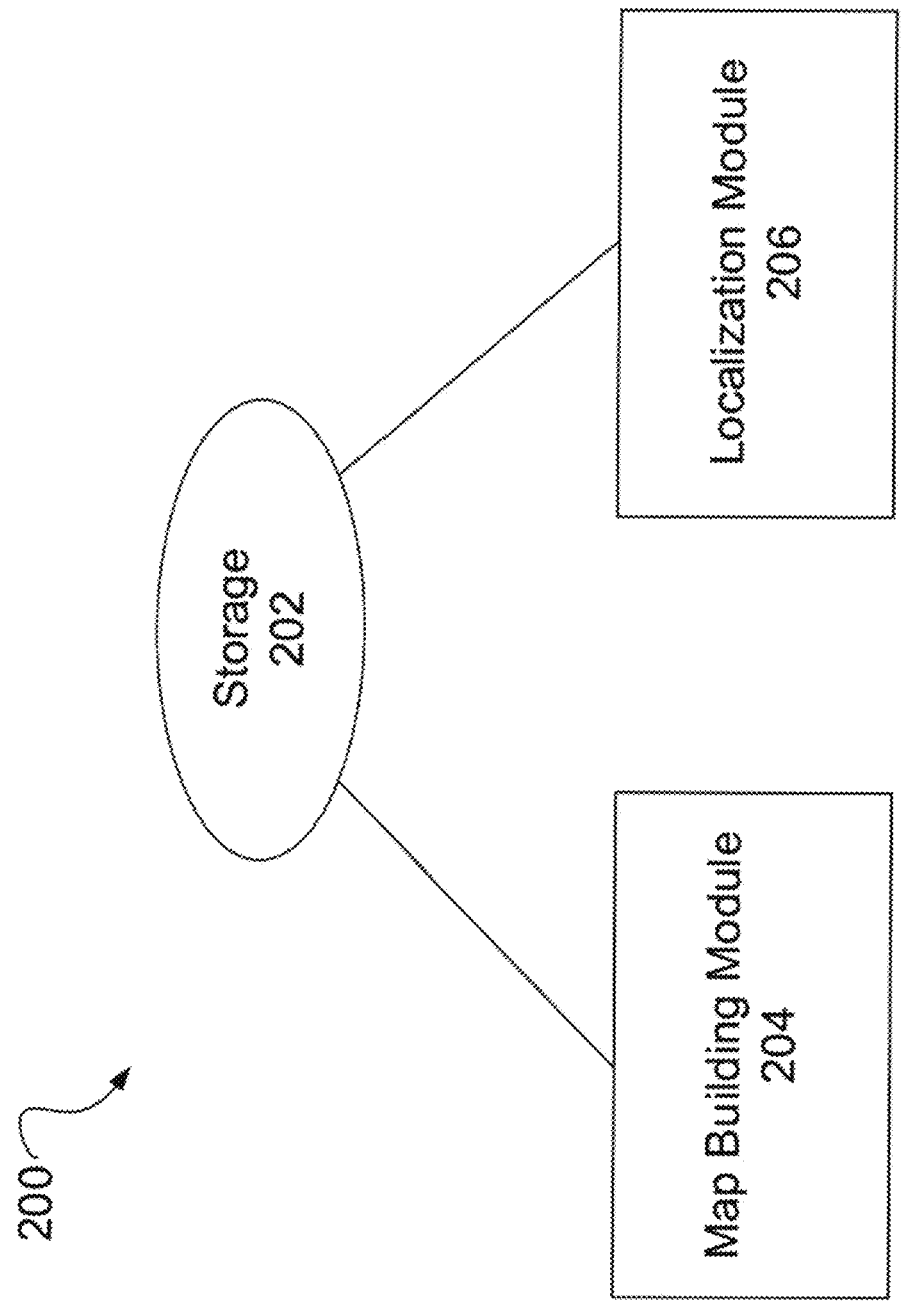
FIG. 2 is a block diagram illustrating an example architecture that includes the interaction between mapping and localization components in order to enable indoor localization.

FIG. 2 is a schematic illustrating an example architecture 200 that includes the interaction between mapping and localization components in order to enable indoor localization. The Map Building Module 204 is responsible for the process of mapping an indoor environment with a mobile device. This process is performed by traversing the navigable paths and areas of a specified destination where localization may later be performed. The Map Building Module 204 generates a map of the specified destination based on computer vision technology, inertial measurements (e.g., acceleration and angular velocity measurements of a device), measurements of local electromagnetic signals (e.g., RF signals) and/or user-entered data. Once generated by the map building module 204, the local map may then be saved on a storage device 202 (e.g., memory on one or more mobile devices and/or on one or more server devices), from which the map may be downloaded for use in a localization process as described above. The map building module 204 includes, but is not limited to, one or more software, hardware, or firmware modules that can be configured to, for example, receive multiple images from an image detector component of a mobile device, receive inertial measurements from one or more inertial measuring components of the mobile device, and/or receive the measurements of local electromagnetic signals. The map building module 204 may be implemented entirely on a single mobile device (e.g., a smartphone) or the processes implemented by the map building module 204 may be implemented across multiple electronic data processing apparatuses (e.g., some processes implemented on a mobile device whereas other processes for building the map are implemented on one or more interconnected servers).

The localization module 206 is responsible for the process of localizing a mobile device in a location that has been previously mapped. Similar to the map building module 204, the localization module 206 includes, but is not limited to, one or more software, hardware, or firmware modules. The localization module 206 may be implemented entirely on a single mobile device (e.g. a smartphone). Accordingly, multiple mobile devices may each run a dedicated localization module 206. The localization module 206 obtains from storage 202 the local map built by the map building module 202. The localization module 206 uses the local map, optionally together with electromagnetic signal measurements and inertial measurements, to estimate a position of the mobile device on the map.

The storage device 202 may be representative of one or more communication and/or computing resources that the map building module 204 and localization modules 206 may communicate with via a network interface. Mobile devices may receive and/or send data to the storage device 202 via a network. The network may include any digital and/or analog data communication network, such as the computers and/or servers that form the Internet. Communicating through the network may rely on any appropriate network communication technology, such as TCP/IP protocol, among others.

Figure 3:
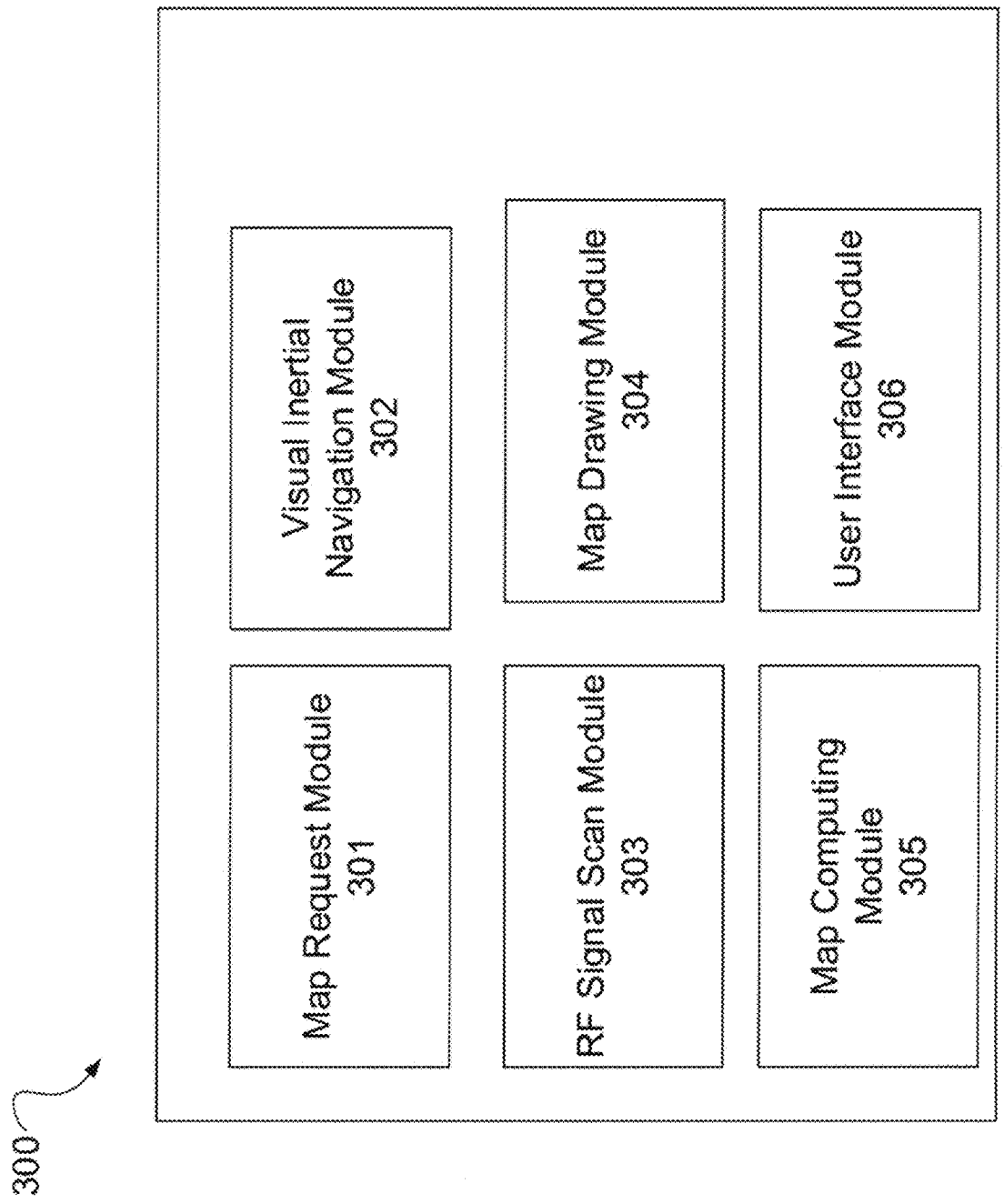
FIG. 3 is a schematic illustrating an example system for building maps.

FIG. 3 is a schematic illustrating an example map building module 300. The map building module 300 may include multiple sub-modules, such as a Mapping Request Module 301, a Visual Inertial Navigation Module 302, a RF Signal Scan Module 303, a Map Drawing Module 304, a Map Computing Module 305, and a User Interface Module 306. The different sub-modules may include, but are not limited to, one or more software, hardware, or firmware modules. The sub-modules may be implemented entirely on a single mobile device (e.g., a smartphone) or across multiple electronic data processing apparatuses (e.g., some sub-modules implemented on a mobile device whereas other sub-modules are implemented on one or more interconnected servers).

The Mapping Request Module 301 is configured to handle requests related to building a local map for a specified destination. The Mapping Request Module 301 may receive one or more requests from a third party to map a location. For instance, the third party may be a retailer (e.g., Home Depot), a manufacturer, an e-tailer, among others. The request from a third party may be received by the mapping request module 301 by text message or by e-mail. The Mapping Request Module 301 may send to a plurality of mobile devices a request to generate a local map for a specified destination. This request serves as a notification to a selection of the mobile devices that are registered with the system that a new mapping task is available. The Mapping Request Module 301 may also retract from the remaining mobile devices the request messages that it previously sent. The Mapping Request Module 301 may be implemented on a mobile device or a server connected to one or more mobile devices through a network.

The Visual Inertial Navigation Module 302 is configured to calculate the trajectory of the mobile device as the user traverses the specified destination. The trajectory is computed relative to the initial location and initial orientation of the mobile device. This trajectory may be computed initially using dead reckoning techniques, and may be further refined using loop closure and global optimization techniques. This function may be implemented entirely on the mobile device, or some portions such as dead reckoning may be performed in part on the mobile device and in part remotely (e.g., on a server device). The Visual Inertial Navigation Module 302 may perform loop closure automatically using camera imagery. Alternatively, the visual inertial navigation module 302 may output a request to the mobile device user to capture images from time to time to provide imagery for loop closure. For example, the module 302 may output a message to a user interface of the mobile device indicating a request that the user capture additional images using the image detector of the mobile device. The Visual Inertial Navigation Module 302 may perform stationary detection when the mobile device is stationery for a period of time (e.g. one second). Stationary detection information may be used to aid in computation of the trajectory of the device. Stationary detection information may be further used to refine the trajectory using global optimization techniques.

The RF Signal Scan Module 303 is configured to perform an electromagnetic signal scan as the mobile device user traverses the specified destination. The RF Signal Scan Module 303 performs the scan in a periodic manner in order to measure one or more signal characteristics, e.g. signal strength, of all available wireless networks, such as Wi-Fi, Bluetooth, ultra wideband (UWB), among others. For example, signal strengths may be based at least in part on a received signal strength (RSS) measured at the mobile device using RF sensors within the device. The electromagnetic signal scanning process performed by the RF Signal Scan Module 303 filters/ignores some of the transmitters observed in the electromagnetic signal scan based on one or more signal characteristics. The mobile device then stores the information related to the signal characteristics.

The Map Drawing Module 304 is an interactive tool that enables a user to draw a map on top of the user trajectories. Once the mobile device user has completed traversing the navigable areas, the Map Drawing Module 304 may request that the user draws a map on top of the user trajectories obtained by the visual inertial navigation module 302. In some implementations, the user may be asked to draw lines in areas that are not traversable, such as walls. In some implementations, the user may be asked to draw boundaries of fixtures (e.g. some or all of the edges of a rectangle to represent a rectangle shaped display in the venue). The user may be asked to annotate other areas on the user trajectories that are traversable, such as the location of doors. In some implementations, the user may be asked to annotate other features, such as the location of specific items or products. The map drawing task may be completed by the user operating the mobile device at the time the trajectories are obtained or by another user at a later time, e.g., on a separate device, such as a desktop computer or another mobile device.

The Map Computing Module 305 is configured to combine the trajectory generated by the visual inertial navigation module 302 with the electromagnetic signal measurement information, e.g. RSS, obtained from the RF scan module 303 and the boundary information and annotations obtained from the map drawing module 304 into a single local map. The local map then may be stored on the mobile device and/or uploaded to a server, from where the map may be downloaded by future users for localization of mobile devices in the same specified destination. In some implementations, one or more stages of the map computing process may be performed entirely on the server device. For example, one or more of the visual, inertial and/or electromagnetic signal measurements may be uploaded to one or more interconnected server devices that subsequently generate the local map based on the received visual, inertial and/or electromagnetic signal measurements.

The User Interface Module 306 is configured to provide a user interface for the map building module 300. In some implementations, map building module 300 may determine that the mobile device is located within a predefined distance (e.g., within 1000 ft., within 500 ft., within 100 ft., within 50 ft., or within 10 ft.) of a specified destination (e.g., based on GPS or cellular signals). Upon determining that the mobile device is within the predefined distance, the User Interface Module 306 may output to a display on the mobile device a notification that the device is ready to collect data for the map generation process. In some implementations, the User Interface Module 306 may output to a display of the mobile device a request to stop in one or more locations in the specified destination in order to annotate one or more features on the map such as, e.g., an aisle number or desired product. In some implementations, the User Interface Module 306 may output to a display of the mobile device a request to traverse one or more navigable areas more than once. In some implementations, the User Interface Module 306 may output on a display of the mobile device a request to traverse all possible routes in the specified destination. In some implementations, the User Interface Module 306 may output on a display of the mobile device an indication that the device is stationary for a period of time. In some implementations, the User Interface Module 306 may output on a display of the mobile device one or more annotations and a request to choose one or more of the annotations.

The process of Mapping may proceed as follows:

The Mapping Request module 301 may initially receive a request from a third party to map a destination. For example, the third party may be a retailer that desires to make a local map of its stores available to customers and to provide customers with location-based content, notifications, routing directions when the customers visit the retailer's stores. The request may be received at the Mapping Request module 301, e.g., through a web interface. The request may include an identification of a destination or destinations (e.g., the retailer's stores) that need to be mapped and annotated.

The Mapping Request module 301 then notifies a selection of mobile devices that are registered with the module 301 that a new mapping task is available. This notification is in the form of a request sent to the mobile device. The mobile device may be selected for notification based on criteria such as the distance between the location to be mapped ("specified destination") and the current location of the mobile device, whether the mobile device is located in a predefined zone (geofence), whether a user has indicated an interest in the mapping task, or whether the user has previously indicated an interest in performing mapping in return for payment. In another implementation notification is sent to all mobile devices registered with the system.

After receiving a notification, the mobile device may present the request to the mobile device user or the request may be ignored. Similar to the Mapping Request module 301, the request may be presented by the mobile device to the user based on criteria such as distance between the location to be mapped ("specified destination") and the current location of the mobile device, whether the device is located in a predefined zone (geofence), whether the user has previously indicated an interest in the mapping task, or whether the user has previously indicated an interest in performing mapping in return for payment. If the request is presented to the user, the user may then select the mapping task. Once the mapping task has been selected, the task is removed from the list of available tasks and other mobile device users will no longer be able to perform the mapping task.

The mapping process may commence when the mobile device user is proximate to the location to be mapped, and when the uncertainty in the mobile device position estimate is below a certain threshold. The mobile device position estimate may be determined using any appropriate positioning technology such as those relying on signals from a satellite positioning system (e.g. GPS, GNSS, GLONASS, Galileo, etc.), cellular network, or a Wi-Fi network. The user may be designated as being proximate to the location to be mapped when the mobile device position estimate is within a predefined distance of the location being mapped (e.g., within about 100 ft., within about 50 ft., or within about 10 ft. of the destination to be mapped).

The mobile device user may identify his location on a map of the destination before commencing the mapping process. When the mapping process commences, the mobile device user traverses navigable areas of the location being mapped such that imagery can be collected with a camera integrated in the mobile device. The mobile device may issue one or more requests that the user annotate certain features on the map, e.g. a store aisle number, meeting room, among other features. In some implementations, the mobile device may issue a request to the user to traverse one or more navigable areas more than once. The mobile device may issue a request to the user to traverse all possible routes in the destination to be mapped.

The visual inertial navigation engine of the mobile device determines the trajectory of the mobile device as the user traverses the destination being mapped. The trajectory may include periods of time where the device was stationary. The trajectory is computed relative to the initial location and initial orientation of the mobile device. This trajectory is computed initially using dead reckoning techniques, and may be further refined using techniques such as loop closure and/or global optimization. The process for determining the trajectory may be implemented entirely on the mobile device, or in some implementations, certain steps, such as dead reckoning, may be performed in part on the mobile device and other steps of determining the trajectory may be performed remotely, e.g., on one or more server devices connected to the mobile device over a network.

The trajectory refinement process may be performed automatically using images obtained by the camera of the mobile device and using stationary information. Alternatively, the refinement process may be performed remotely, e.g., on one or more server devices connected to the mobile device over a network. Requests may be sent from the remote server(s) to the mobile device user from time to time to capture images for loop closure.

As the mobile device user traverses the destination to be mapped, the mobile device may perform an electromagnetic signal scan in a periodic manner in order to measure one or more signal characteristics, e.g. signal strength, of available wireless networks, such as Wi-Fi, Bluetooth, among others. For example, signal strengths may be based at least in part on a received signal strength indicator (RSS) measured at the mobile device. The electromagnetic signal scanning process trims some of the transmitters observed in the electromagnetic signal scan based on one or more signal characteristics. The mobile device then stores the information related to the signal characteristics.

In some implementations, once the mobile device user has completed traversing the navigable areas, the trajectory boundary information and annotations may be added to the trajectory that was obtained using the visual inertial navigation engine. For example, using an interactive drawing program installed on the mobile device, the user may draw boundaries on top of the trajectories. In some implementations, the user may draw a first set of boundaries indicative of areas that are not traversable, such as walls, and a second set of boundaries indicative of areas that may be traversable, such as doors. In some implementations, the drawing of trajectory boundaries and annotations task may be completed by a user on a separate device, such as a desktop computer or another mobile device.

In some implementations, the trajectory generated by visual inertial navigation engine is combined with the measured electromagnetic signal information, the trajectory boundary information, and the annotations into a single local map of the destination. This local map then may be uploaded to a server device, where it is available to be downloaded by customers for localization of mobile devices in the same destination. In some implementations, combining the trajectory, boundary information, annotations, and measured electromagnetic signal information is performed entirely on the mobile device. Alternatively, the foregoing features may be combined on a separate device, such as a server connected to the mobile device through a network. In such cases, one or more of the visual, inertial and/or electromagnetic signal measurements may be uploaded to the server device from the mobile device.

Figure 4:
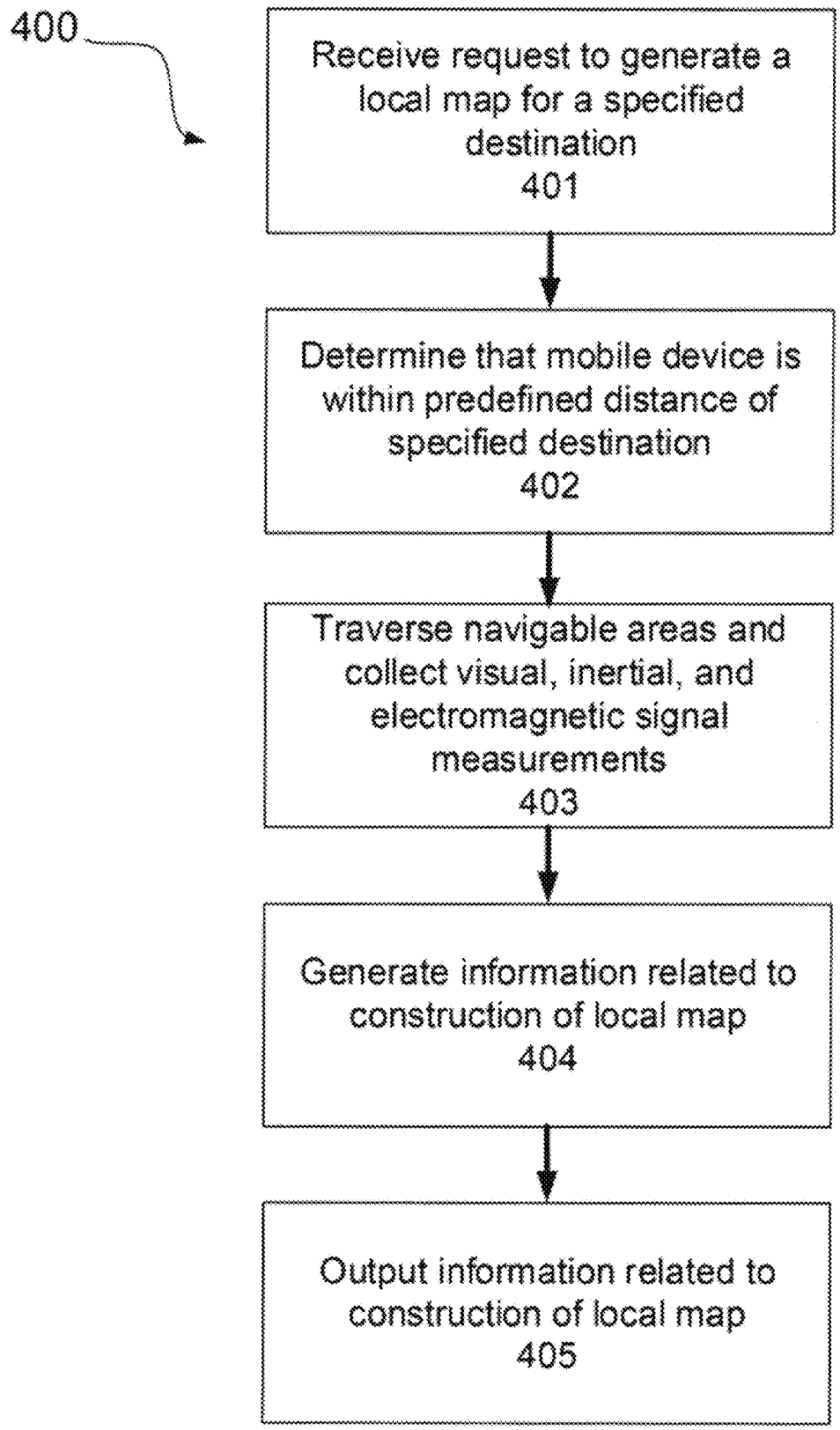
FIG. 4 is a flow diagram illustrating an example process for use in generating a local map.

FIG. 4 is a flow diagram illustrating certain features of an example process 400 for generating a local map implemented by the map building module (e.g., map building module 300). At example block 401, a mobile device (e.g., mobile device 104) may receive a request (e.g., request 103) to generate a map for a specified destination. The request may be received from a server device (e.g., server device 105). The request may be pushed down to the mobile device from the server automatically. Alternatively or in addition, in some implementations, the request may be obtained by the mobile device through a web interface. The specified destination may indicate a location or building to be annotated (e.g., a store), an area with multiple locations and/or buildings to be annotated, or even a portion of an building or other structure to be annotated (e.g., one or more rooms of a building).

The server may send the request to the mobile device based on criteria such as a distance of specified destination from the current location of the mobile device, whether the mobile device is located in a predefined zone (e.g., a geofence), user interest in the mapping task, payment for labor, among other factors. If the request is sent from the server to the mobile device, a user may accept the mapping request through a user command input to the mobile device, after which the mobile device may subsequently send to the server device a message accepting the mapping request.

At example block 402, the map building module determines whether the mobile device is within a predefined distance of the specified destination for beginning the map generation process. For instance, if the map building module determines that the mobile device is located within 50 feet of the specified destination, the map generation process may commence automatically or the map building module may output to a display on the mobile device a notification that the device is ready to collect data for the map generation process. An estimate of the mobile device position may be determined using any appropriate positioning technology, such satellite positioning (e.g. GPS, GNSS, GLONASS, Galileo, etc.), cellular network positioning, Wi-Fi network based positioning, among others.

At example block 403, the user begins traversing the navigable areas of the specified destination (e.g., an indoor environment) with the mobile device such that data can be collected. The collected data may include imagery obtained using an image detector (e.g., camera) of the mobile device. In addition, the mobile device may include inertial sensors that collect inertial measurements that record inertial data (e.g., acceleration and orientation such as angular velocity) of the mobile device as the user and device move together.

In some implementations, the mobile device is further configured to collect boundary information (e.g., the outline of walls, door frames, shelves, fixtures). Boundary information is collected as a sequence of edges. The collection of edges may include placing the mobile device on some or all of the walls in a venue or placing the mobile device on some or all of the sides of one or more fixtures. Placing the mobile device may include holding the mobile device stationary on an edge for a certain period of time (e.g. one second).

In some implementations, the mobile device is further configured to collect user input via a user interface. User input may be a text user 102 types (e.g. a label) or predefined annotations to define the floor plan (e.g. for room types, fixture types, doors, staircases, cashiers, etc.) or to define items located in the venue at the place the data is being collected (e.g. a placement of a product of interest, a placement of signage of interest, placement of a custom re-skinnable fixture—nCap).

In some implementations, the mobile device may also include one or more electromagnetic receivers and/or transceivers that record electromagnetic signal measurements. The electromagnetic signals may be received from transmitters in wireless networks located at the specified destination, such as Wi-Fi, wide local area network (WLAN), Bluetooth, among others. The transmitter may comprise a Wi-Fi and/or WLAN access point, Bluetooth node, location beacon or other similarly short-ranged wireless node. The mobile device may measure one or more signal characteristics from the electromagnetic signals. For instance, the mobile device may record the received signal strength (RSS) of the electromagnetic signals. The mobile device may store the information related to the signal characteristics and/or any other information available from the electromagnetic signal.

At example block 404, the map building module generates information related to the construction of the map of the specified destination. For example, the visual navigation engine of the map building module may create a trajectory followed by the user carrying the mobile device at the specified destination. The information related to the construction of the map may also include additional information about the specified destination, such as boundary information (e.g., the presence and orientation of walls, doors, shelves, fixtures). The boundary information may also indicate whether certain boundaries are permeable (e.g., a clothing rack that may be moved out of the way) or impermeable (e.g., a cinder-block wall). In some implementations, the information related to the construction of the map may include annotations provided by the user or received from a third party that will be attached to the map. For example, the annotations may include indicators of where certain products or features are located at the specified destination. Alternatively, or in addition, the annotations may include offers for sale on items available at the specified location.

The map building module may combine the trajectory information with the boundary information and/or annotations to create a map of the specified destination. For example, the map may include outlines depicting where boundaries are found as well as pathways between the outlines indicating where a user may travel (based, e.g., on the previously determined trajectories). In some implementations, the map building module may overlay information about the measured electromagnetic signal measurements on the map, such as indicators as to where the strongest RF signals may be found.

At example block 405, the map building module outputs the information related to the construction of the map of the specified destination. In some implementations, the information related to the construction of the map includes the trajectory information recorded by the user, the boundary information, the annotations, and/or the measured electromagnetic data. Such information may be transmitted from the mobile device to one or more servers that perform the final step of constructing the map. Alternatively, in some implementations, the map may be generated entirely on the mobile device and the information related to the construction of the map includes the completed map itself. Accordingly, the completed map then may be transmitted to one or more server devices for storage and downloading by one or more other users. Different aspects of the map building module may be implemented either locally in the mobile device or remotely on one or more server devices. For instance, the mobile device may generate the trajectory only, whereas creating the boundary information and annotations, and combining the trajectories, boundary information and annotations into a final map are performed on the one or more server devices. In other implementations where some of the local map generation is performed remotely, one or more of the visual, inertial and/or electromagnetic signal measurements are outputted to the remote entity, such as a server device and the local map generation is completed on the remote entity.

Figure 5:
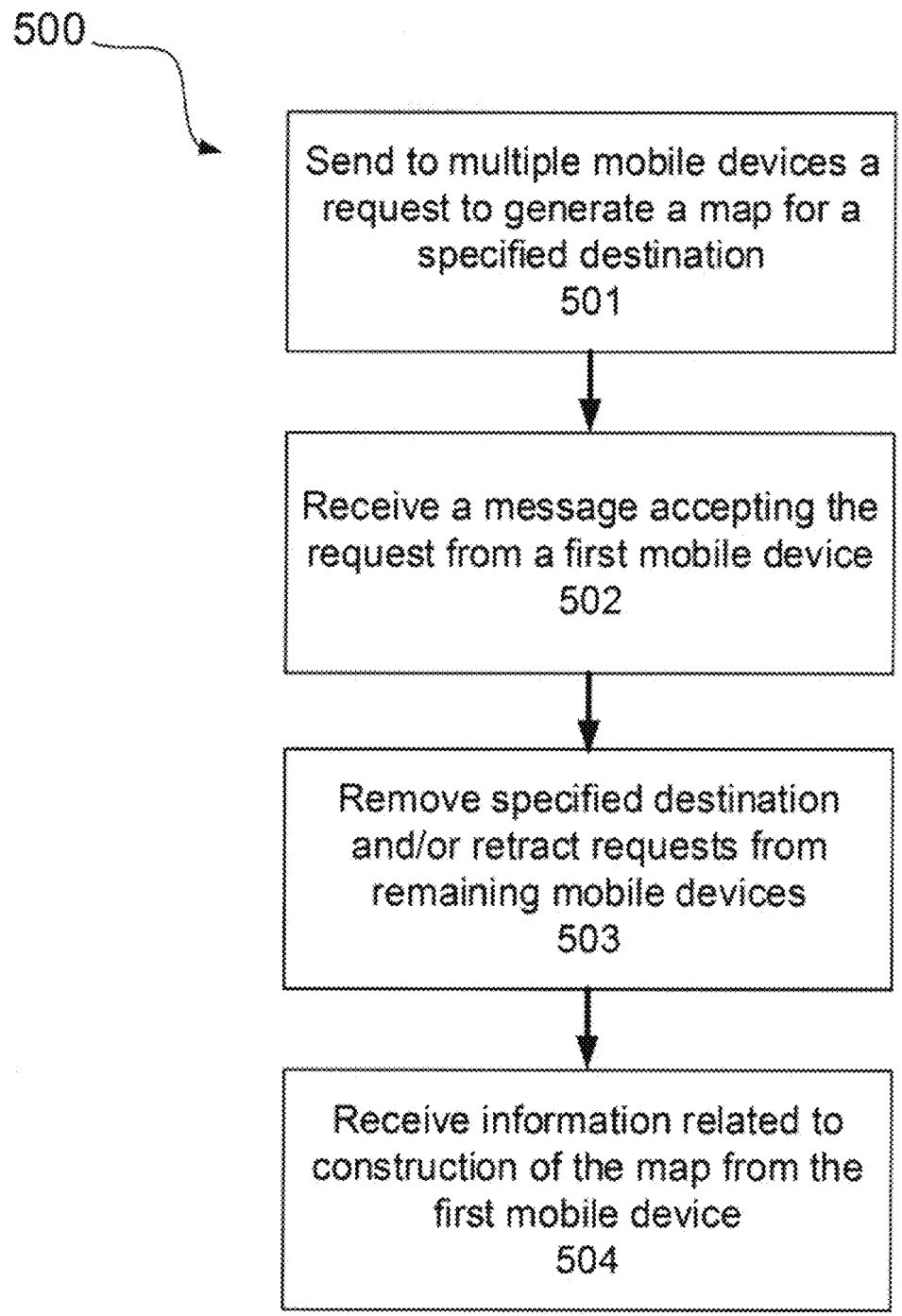
FIG. 5 is a flow diagram illustrating an example process for use in requesting and generating a local map.

FIG. 5 is a flow diagram illustrating certain features of an example process 500 performed by a server for requesting multiple mobile devices to provide information related to a local map, in which a first mobile device accepts the request and the requests are retracted for the remaining mobile devices. In the example associated with FIG. 5, the multiple mobile device users compete to select a mapping task.

At example block 501, the server device sends to multiple mobile devices a request to generate a local map for a specified destination. The request serves as a notification to the mobile devices that a new mapping task is available. The request may be in the form of, for example, a text message, e-mail, audio message, and/or video message. In order to receive the request, the mobile devices may need to be registered with an associated mapping service. For instance, the server may store a database containing a list of mobile device users that are registered with the mapping service and will only send the request to map a specified destination to mobile device users within that list.

The mobile devices may be further selected to receive the request based on additional criteria such as distance from the specified destination, whether the mobile device is currently located in a predefined zone (e.g., a geofence), user interest in the mapping task, payment for labor, among other factors. For example, the server device may have previously received one or more notifications from users registered with the mapping service regarding the user interest in performing mapping tasks. Thus, the request will only be sent to the mobile devices of registered users that have sent a notification indicating an interest in performing mapping tasks. The request may specify a destination (e.g., a building or store, an area with several buildings and stores, a subset of a building or store) that needs to be annotated.

At example block 502, the server device receives from a first mobile device a message accepting the request. Once the first mobile device user has selected the mapping task, the server may remove (503) the specified destination from a list of destinations to be mapped. Alternatively, or in addition, the server device may retract the request to map the specified destination from the other mobile device users such that those users will no longer be able to perform the mapping task. Alternatively, or in addition, the server device may send a notification to the other mobile device users (i.e., those that did not respond or responded too late) that the mapping task is no longer available. As before, the notification may be sent in the form of, for example, a text message, e-mail, audio message, and/or video message.

At example block 504, the server device receives information related to the construction of a local map from the first mobile device that has accepted the request. For example, the first mobile device may e-mail or upload the information related to the construction of the map to the server device. In some implementations, the local map may be constructed entirely on the first mobile device, and the server device receives this local map. In an alternative implementations, the information related to the construction of the map does not include a completed map and instead includes information such as trajectory information recorded by the first mobile device, electromagnetic measurements made by the first mobile device, boundary information obtained by the first mobile device, and/or annotations obtained by the first mobile device. The server device may then complete the construction of the map based on the information provided by the first mobile device.

In some implementations, the information related to the construction of the map is uploaded to multiple interconnected server devices (e.g., a cloud service). The multiple interconnected server devices may complete the construction of the map based on the information obtained from the first mobile device.

FIG. 6 is a flow diagram illustrating an example process for performing visual inertial navigation to obtain a trajectory of the mobile device as the user traverses the indoor environment. At example block 601, the mobile device receives images from a camera together with the time that the image was captured. At example block 602, the mobile device receives motion measurements from an inertial measurement unit (IMU) of the mobile device, including for example acceleration and/or angular velocity measurements, together with the time that each such measurement was captured. The inertial measurement unit may include sensors such as accelerometers and gyroscopes.

At example block 603, the visual inertial navigation engine identifies image features in some or all of the images. Image features are pixel coordinates for an object or part of an object imaged by the image sensor. The mobile device also identifies objects or parts of objects that are observed in more than one image and stores correspondence information linking observations of the same object or part of an object in different images.

At example block 604, the visual inertial navigation engine calculates an initial trajectory for the mobile device based on the location of image features, the correspondence information between image features in different images, and the motion measurements from the IMU. The mobile calculates the trajectory by considering a plurality of trajectories and picking the one that minimizes a cost function, which is a function that assigns to each trajectory a number indicating how consistent that trajectory is with the location of image features, the correspondence information between image features in different images, stationary periods in the trajectory and the motion measurements from the IMU. Further information on determining a trajectory of a mobile device based on image detection and inertial measurements can be found, for example, in U.S. Patent Application Publication number: US20150043784 A1, filed on Aug. 12, 2014.

At example block, 605 the visual inertial navigation engine identifies loop closures, which are times when the mobile device has returned to a previous visited location. Loop closures are detected identifying images that have many elements in common with previously captured images.

At example block, 606 the visual inertial navigation engine calculates a second trajectory based on the initial trajectory and the loop closures. In this step the visual inertial navigation engine performs an optimization that considers multiple trajectories and picks the one that minimizes a second cost function, which is a function that assigns to each trajectory a number indicating how consistent that trajectory is with the location of image features, the correspondence information between image features in different images, the motion measurements from the IMU, stationary periods in the trajectory and the loop closures.

At example block, 607 the inertial navigation engine outputs the second trajectory to a display or storage device.

FIG. 7 is a flow diagram illustrating an example process for localizing a mobile device using a local map generated using the map building module. At example block 701, the mobile device receives motion measurements from an inertial measurement unit (IMU) on the mobile device, including for example acceleration and/or angular velocity measurements, together with the time that each such measurement was captured. The inertial measurement unit may include sensors such as accelerometers and gyroscopes. The measurements from the IMU may be forwarded to the localization module running on the mobile device.

At example block 702, the localization module receives a local map from a server, in which the local map was created using the map building module as described above. The local map may include boundaries within the environment (walls and other structures) as well as information about electromagnetic signals within the environment.

At example block, 703 the localization module receives signal strength information about electromagnetic signals in the vicinity of the device from an electromagnetic sensor. Such signals may include Wi-Fi (e.g., about 2.4 GHz or about 5 GHz) and/or Bluetooth (e.g., about 2.40-2.48 GHz) low energy signals.

At example block 704, the localization module calculates the number of footsteps the user has taken based on patterns in the motion measurements that indicate the user's footsteps. For example, the localization module may calculate the autocorrelation function of the acceleration measurements received from the inertial measurement unit (IMU) and identify the time offset at which the autocorrelation function is maximized. The localization module may then calculate the number of steps the user has taken by dividing the time interval over which the autocorrelation was computed by the time offset at which the autocorrelation function is maximized.

At example block 705, the localization computes, for each particle currently stored within the particle filter (see example block 706 below) a number representing the probability for observing the signal strength information from example block 703 given the position stored within the particle. The probability may be calculated by interpolating between one or more signal strength measurements stored within the local map from example block 702.

At example block 706 the localization module calculates the current position of the device based on the footstep estimate, the local map from the server, and numbers representing probabilities for each particle from example block 705. The mobile device may use a particle filter for this purpose, in which multiple particles (a particle is an object containing a position, orientation, and a weight) are stored. The initial set of particles is created by sampling a fixed number of random positions and orientations, and setting all initial weights to 1. Each time a new input is received from example blocks 704, 702, or 705, the particle filter updates the particles as follows. First, for each current particle, a new position and orientation is calculated based on the most recent motion measurement received and the existing position and orientation stored within the particle. Second, particles that have moved outside the bounds of the local map are deleted. Third, a new weight is calculated for each particle is updated by multiplying the current weight for the particle by the value of the nonlinear process likelihood function at the position currently stored within the particle.

Fourth, particles are resampled such that particles with low weights are replaced by copies of other particles with high weights.

At example block 707, the localization module outputs a current estimated location by calculating a weighted average of the positions of all particles currently stored by the particle filter in example block 707, in which the weight of each particle is set to the weight number stored within that particle. For example, the current estimated location may be output to a display and overlaid on the map generated by the map building module.

Implementations of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Implementations of the subject matter described in this specification can be implemented as one or more computer programs, i.e., one or more modules of computer program instructions encoded on a tangible non transitory program carrier for execution by, or to control the operation of, data processing apparatus. The computer storage media can include machine-readable storage devices, machine-readable storage substrates, random or serial access memory devices, or a combination of one or more of them.

The mobile devices referenced above are examples of electronic data processing apparatuses. The term "electronic data processing apparatus" refers to data processing hardware and encompasses all kinds of apparatus, devices, and machines for processing data, including by way of example a programmable processor, a computer, or multiple processors or computers. The apparatus can also be or further include special purpose logic circuitry, e.g., an FPGA (field programmable gate array) or an ASIC (application specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, application, application module, engine, software engine, software, a software application, a software program, a module, a software module, a script, or code, can be written in any form of programming language, including compiled or interpreted languages, or declarative or procedural languages, and it can be deployed in any form, including as a standalone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a data communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Data processing apparatuses suitable for the execution of a computer program include, by way of example, can be based on general or special purpose microprocessors or both, or any other kind of central processing unit. Generally, a central processing unit will receive instructions and data from a read only memory or a random access memory or both. The essential elements of a data processing apparatus are a central processing unit for performing or executing instructions and one or more memory devices for storing instructions and data. Generally, a data processing apparatus will also include, or be operatively coupled to receive data from or transfer data to, or both, one or more mass storage devices for storing data, e.g., magnetic, magneto optical disks, or optical disks. However, a data processing apparatus need not have such devices. Moreover, a data processing apparatus can be embedded in another device, e.g., a mobile telephone, a personal digital assistant (PDA), an electronic tablet device, smart glasses, a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a data processing apparatus having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a data processing apparatus can interact with a user by sending documents to and receiving documents from a device that is used by the user; for example, by sending web pages to a web browser on a user's device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the user device, which acts as a client. For example, mobile devices 104 and 110 may be client devices, whereas server 105 may be a server device. Data generated at the mobile device, e.g., a result of the user interaction and/or mapping, can be sent from the mobile device to the server 105. Similarly, requests 103 from the server 105 may be sent to the mobile device 104 or made available to the mobile device 104 through a website. In some implementations, the maps that are generated using the techniques of the present disclosure may be stored across multiple interconnected server devices, such as in a cloud service. Similarly, the one or more of the processes associated with generating the map may also be implemented across multiple interconnected server devices.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable sub combination. Moreover, although features may be described above as acting in certain combinations and even initially claimed as such, one or more features from a claimed combination can in some cases be excised from the combination, and the claimed combination may be directed to a sub combination or variation of a sub combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular implementations of the subject matter have been described. Other implementations are within the scope of the following claims. For example, the actions recited in the claims can be performed in a different order and still achieve desirable results.

What is claimed is:

1. A device comprising:
    a processor; and
    a memory comprising instructions executable by the processor to:
        receive, at a mobile device, a series of images;
        receive, at the mobile device, inertial data;
        identify a trajectory of the mobile device based on a cost minimization of candidate trajectories determined using the series of images and the inertial data;
        identify a loop closure in response to determining that a first image of the series of images matches a second image of the series of images;
        generate, in response to identifying the loop closure, a refined trajectory using the trajectory, the series of images, the inertial data, and the loop closure; and
        generate a map based on refined trajectory.

2. The device of claim 1, wherein the instructions to identify a trajectory of the mobile device based on a cost minimization of candidate trajectories determined using the series of images and the inertial data further comprises instructions to:
    assign a first cost to a first candidate trajectory based on consistency of the first candidate trajectory with a plurality of factors, the plurality of factors including locations of features within the series of images, correspondence between features in the series of images, stationary periods indicated by the inertial data, and motion measurements indicated by the inertial data;
    assign a second cost to a second candidate trajectory based on consistency of the second candidate trajectory with the plurality of factors; and
    select the first candidate trajectory as the trajectory based on a comparison of the first cost to the second cost.

3. The device of claim 2, wherein the memory further includes instructions executable by the processor to:
    assign a third cost to a third candidate trajectory based on consistency of the third candidate trajectory with the plurality of factors and the loop closure;
    assign a fourth cost to a fourth candidate trajectory based on consistency of the fourth candidate trajectory with the plurality of factors and the loop closure; and
    select the third candidate trajectory as the refined trajectory.

4. The device of claim 3, wherein the memory further includes instructions executable by the processor to select the third candidate trajectory and the fourth candidate trajectory based on the identified trajectory.

5. The device of claim 1, wherein the memory further includes instructions executable by the processor to generate a map based on the refined trajectory.

6. The device of claim 5, wherein the memory further includes instructions executable by the processor to initiate transmission of data representing the map to another device.

7. The device of claim 5, wherein the memory further includes instructions executable by the processor to generate a user interface configured to receive drawing input indicating a position of a boundary around the refined trajectory, wherein the instructions executable by the processor to generate the map based on the refined trajectory are executable to generate the map based further on the position of the boundary.

8. The device of claim 5, wherein the memory further includes instructions executable by the processor to:
    generate a user interface configured to present a request to place the mobile device at a boundary; and
    identify a location as a position of the boundary in response to determining that the mobile device has been located at the location for a threshold period of time, wherein the instructions executable by the processor to generate the map based on the refined trajectory are executable to generate the map based further on the position of the boundary.

9. A non-transitory computer readable medium comprising instructions executable by a processor to:
    receive, at a mobile device, a series of images;
    receive, at the mobile device, inertial data;

identify a trajectory of the mobile device based on a cost minimization of candidate trajectories determined using the series of images and the inertial data;

identify a loop closure in response to determining that a first image of the series of images matches a second image of the series of images;

generate, in response to identifying the loop closure, a refined trajectory using the trajectory, the series of images, the inertial data, and the loop closure; and generate a map based on refined trajectory.

10. The non-transitory computer readable medium of claim 9, wherein the instructions to identify a trajectory of the mobile device based on a cost minimization of candidate trajectories determined using the series of images and the inertial data further comprises instructions to:

assign a first cost to a first candidate trajectory based on consistency of the first candidate trajectory with a plurality of factors, the plurality of factors including locations of features within the series of images, correspondence between features in the series of images, stationary periods indicated by the inertial data, and motion measurements indicated by the inertial data;

assign a second cost to a second candidate trajectory based on consistency of the second candidate trajectory with the plurality of factors; and select the first candidate trajectory as the trajectory based on a comparison of the first cost to the second cost.

11. The non-transitory computer readable medium of claim 10, wherein the instructions executable by the processor to refine the trajectory include instructions executable by the processor to:

assign a third cost to a third candidate trajectory based on consistency of the third candidate trajectory with the plurality of factors and the loop closure;

assign a fourth cost to a fourth candidate trajectory based on consistency of the fourth candidate trajectory with the plurality of factors and the loop closure; and select the third candidate trajectory as the refined trajectory.

12. The non-transitory computer readable medium of claim 11, further comprising instructions executable by the processor to select the third candidate trajectory and the fourth candidate trajectory based on the identified trajectory.

13. The non-transitory computer readable medium of claim 9, further comprising instructions executable by the processor to generate a map based on the refined trajectory.

14. The non-transitory computer readable medium of claim 13, further comprising instructions executable by the processor to initiate transmission of data representing the map to another device.

15. The non-transitory computer readable medium of claim 14, further comprising instructions executable by the processor to generate a user interface configured to receive drawing input indicating a position of a boundary around the refined trajectory, wherein the instructions executable by the processor to generate the map based on the refined trajectory are executable to generate the map based further on the position of the boundary.

16. The non-transitory computer readable medium of claim 14, further comprising instructions executable by the processor to:

generate a user interface configured to present a request to place the mobile device at a boundary; and identify a location as a position of the boundary in response to determining that the mobile device has been located at the location for a threshold period of time, wherein the instructions executable by the processor to generate the map based on the refined trajectory are executable to generate the map based further on the position of the boundary.

17. A method comprising:

receiving, at a mobile device, a series of images;

receiving, at the mobile device, inertial data;

identifying a trajectory of the mobile device based on a cost minimization of candidate trajectories determined using the series of images and the inertial data;

identifying a loop closure in response to determining that a first image of the series of images matches a second image of the series of images;

generating, in response to identifying the loop closure, a refined trajectory using the trajectory, the series of images, the inertial data, and the loop closure; and generating a map based on refined trajectory.

18. The method of claim 17, wherein identifying the trajectory includes:

assigning a first cost to a first candidate trajectory based on consistency of the first candidate trajectory with a plurality of factors, the plurality of factors including locations of features within the series of images, correspondence between features in the series of images, stationary periods indicated by the inertial data, and motion measurements indicated by the inertial data;

assigning a second cost to a second candidate trajectory based on consistency of the second candidate trajectory with the plurality of factors; and selecting the first candidate trajectory as the trajectory based on a comparison of the first cost to the second cost.

19. The method of claim 18, wherein refining the trajectory includes:

assigning a third cost to a third candidate trajectory based on consistency of the third candidate trajectory with the plurality of factors and the loop closure;

assigning a fourth cost to a fourth candidate trajectory based on consistency of the fourth candidate trajectory with the plurality of factors and the loop closure; and selecting the third candidate trajectory as the refined trajectory.

20. The method of claim 19, further comprising identifying the third candidate trajectory and the fourth candidate trajectory are selected based on the identified trajectory.

* * * * *